Patented July 6, 1937

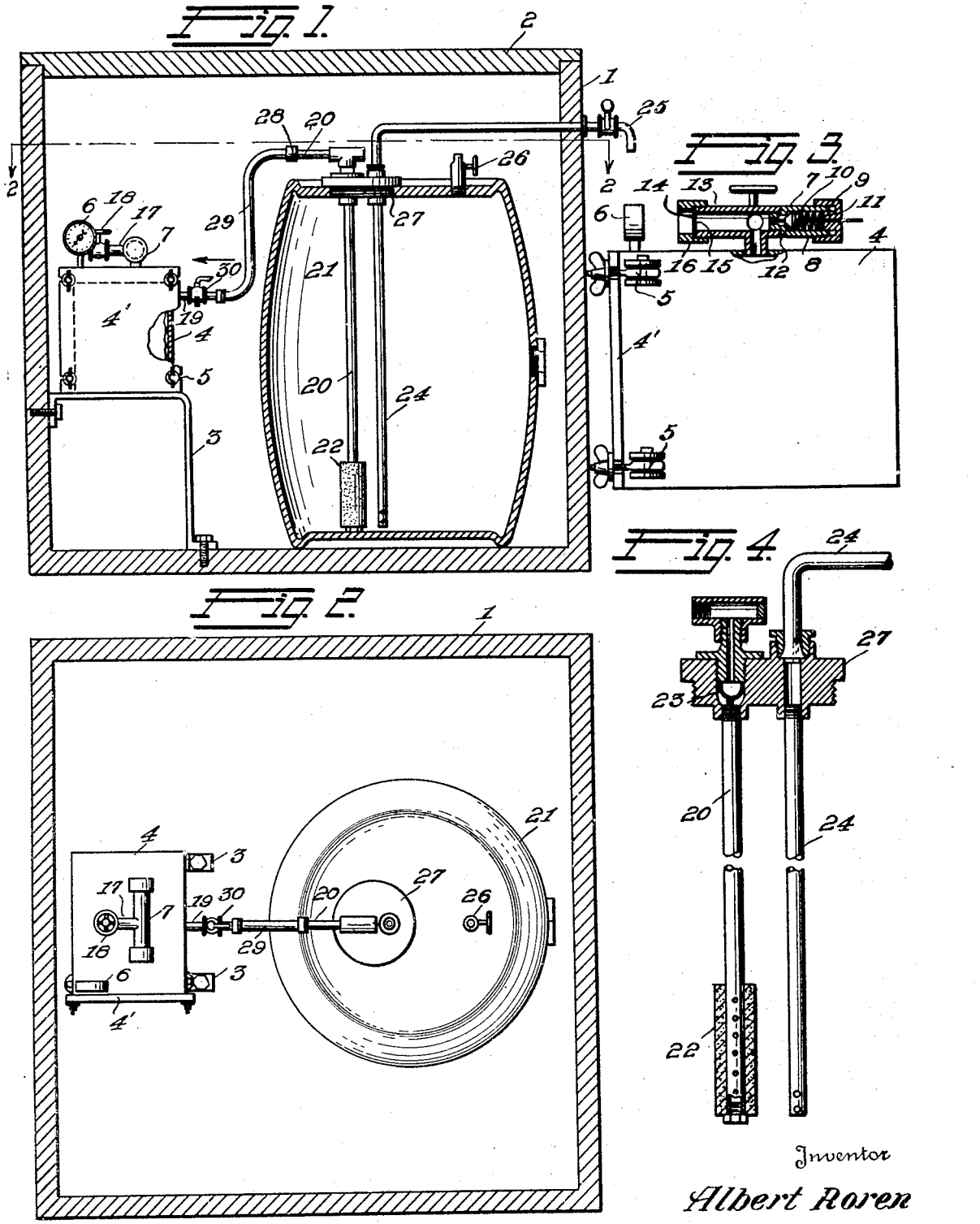

2,086,000

UNITED STATES PATENT OFFICE 2,086,000

CARBONATING AND DISPENSING APPARATUS

Albert Roren, New York, N. Y., assignor to Carbonaire Beverage Dispenser, Inc., New York, N. Y., a corporation of New York Application May 25, 1936, Serial No. 81,738

2 Claims. (Cl. 225—21)

This invention relates to the carbonating and dispensing of beverages or liquids.

An object of the invention is to provide an apparatus for carbonating and dispensing beverages or liquids wherein the body of beverage or liquid in a non-mobile state is carbonated and placed under the desired head pressure for dispensing by means of low pressure gaseous carbon dioxide liberated by the evaporation of solid carbon dioxide.

Another object of the invention is to provide an apparatus for carbonating and dispensing beverages or liquids wherein a non-mobile body of beverage or liquid is carbonated by the intimate commingling of gaseous carbon dioxide in a highly dispersed state therewith.

A further object of the invention is to provide an apparatus for carbonating and dispensing beverages or liquids which utilizes the gaseous carbon dioxide liberated by the evaporation of solid carbon dioxide to carbonate the liquid or beverage and place it under a head pressure sufficient for dispensing purposes and the cold generated by the evaporation of the solid carbon dioxide to cool the body of carbonated liquid or beverage.

Other objects and advantages will be apparent as the invention is described in greater detail in connection with the accompanying drawing wherein:

Figure 1 is a side elevation view, partly in section, showing the carbonating and dispensing apparatus of the present invention.

Figure 2 is a plan view, taken on the line 2—2 of Figure 1.

Figure 3 is a side elevation view taken in the direction of the arrow in Figure 1, showing the specific structure of the bleeder valve and safety fuse attached to the receptacle containing the block of solid carbon dioxide.

Figure 4 is an enlarged side elevation view, in section, showing the specific structure of the carbonating and dispensing unit.

Referring to the drawing, the numeral 1 designates a closed insulated housing having a detachable cover 2. Disposed within the housing 1 and resting upon supports 3 is a box or receptacle 4 which is of such size and dimensions as to receive a piece of a solid refrigerant like solid carbon dioxide of the standard size. This box or receptacle is made of metal and is so constructed that it will withstand the pressure of the gaseous carbon dioxide generated by the evaporation of the solid carbon dioxide. This box or receptacle is closed pressure tight by any suitable means such as a cover 4' clamped on tightly by clamps 5.

Into the top of the receptacle 4 is screwed a cross connection 7 which has three passages or branches. To one branch 8 there is attached a bleeder valve 9 which comprises a needle valve 10 seated under the pressure of a spring 11 to close the opening 12 in the valve. The seating of the needle valve 10 may be adjusted so that the pressure of the gas contained in the receptacle 4 is at any desired pressure, say 45 to 50 lbs. pressure. To another branch 13, the one directly opposite, there is attached a blow out fuse 14 of the conventional type which will blow out and permit the escape of the gas when the pressure in the receptacle goes beyond the set point and such excess is not exhausted fast enough by the setting of the bleeder valve 9. Such fuse comprises a membrane 15, and an apertured nut 16 To the third branch 17 is secured a pet cock 18 which is for the purpose of exhausting the gas contained therein whenever it is desired to renew the charge of solid carbon dioxide. The receptacle 4 is also provided with a suitable pressure gauge 6 for registering the pressure within the receptacle.

Leading from the box or receptacle 4 is a pipe 19 which carries a flexible tubing 29 for conveying the gaseous carbon dioxide into a pipe 20 extending into and through a container 21 containing the liquid to be carbonated. The pipe 19 is provided with a pet cock 30 for controlling the discharge of the gas into the pipe 20. The lower end of the pipe 20 is provided with a plurality of perforations for the egress of the gas therethrough. Surrounding the perforated portion of the pipe 20 and secured thereto is a porous stone 22. The structure of the stone is such that it has a great multitude of minute openings which causes the dissemination of the gaseous carbon dioxide into a highly dispersed state in its passage therethrough. The top of the pipe 20 is provided with a rubber check valve 23 which permits the gas to pass downwardly and through the said pipe but prevents the gas to travel in the opposite direction.

The container 21 is also provided with another pipe 24 for dispensing the liquid contained therein, such pipe extending from the bottom of the container and out through the housing 1. The end of the pipe 24 on the outside of the housing is provided with a dispensing faucet 25. The opposite end of the pipe 24 is preferably provided with an opening for the flow of liquid thereinto. The container 21 has also a pet cock 26 for exhausting the gas therein whenever it is desired to recharge same with another supply of beverage or liquid to be carbonated.

In operation of the carbonating and dispensing apparatus of the present invention, a block of solid carbon dioxide is placed within the receptacle 4, and the receptacle then closed pressure tight by means of the cover 4' and clamps 5. The bleeder valve 9 is adjusted to regulate the pressure within the receptacle 4.

The container 21 is next filled with the liquid to be carbonated and dispensed. The liquid may be water or a mixture or syrup capable of forming a soft drink or beverage and water. The carbonating and dispensing unit is next inserted in the container and secured in place by means of the plug 27. The flexible tubing 19 is next secured to the pipe 20 by means of the coupling 28. The pet cock 30 is then opened whereupon the housing is closed by the cover 2.

The absorption of the heat by the solid carbon dioxide contained in the receptacle 4 causes the evaporation of the solid carbon dioxide and the consequent generation of carbon dioxide gas. The evaporation of the solid carbon dioxide causes a thin film of frozen moisture to form upon the exterior walls of the receptacle 4 which film cools the interior of the housing 1 and thereby the liquid contained in the container 21.

The liberation of carbon dioxide gas by the evaporation of the solid carbon dioxide causes an increase of pressure within the interior of the receptacle 4, the pressure being recorded on the gauge 6. The carbon dioxide gas thus liberated passes from the receptacle 4 through the pipe 19 into flexible tubing 29 and thence into pipe 20. The gas delivered to the pipe 20 escapes through the perforations therein and is forced through the multitude of minute openings in the porous stone 22 into contact with the body of liquid in the container 21. In its passage through these minute openings the gas is disseminated into a highly dispersed state. In such highly dispersed state, the gas is then caused to contact and commingle with the entire body of liquid in the container 21 and thereby carbonate it during its passage therethrough. Since the gas is under pressure, the carbonated body of liquid is simultaneously placed under a head of pressure sufficient for discharge through the pipe 24 upon the opening of the dispensing faucet 25.

While the invention has been described with specific reference to the accompanying drawing, it is not limited to the particular construction and arrangement shown and described herein.

Having fully described the invention, what I claim as new and desire to secure by Letters Patent is:

1. Apparatus for carbonating and dispensing beverages or liquids comprising an insulated housing, a closed container made of heat conducting material for the reception of solid carbon dioxide mounted in said housing, means carried by said container and arranged to open above a predetermined pressure and liberate gas from said container into said housing, a receptacle adapted to contain a body of beverage or liquid to be carbonated disposed in said housing, a conduit leading from said container and extending through and terminating at a point adjacent the bottom of said receptacle for conveying the gaseous carbon dioxide from said container into said receptacle beneath the surface of the body of beverage or liquid contained therein, means carried by the terminating end of said conduit for disseminating the gaseous carbon dioxide into a highly dispersed state and introducing same into contact with the body of the beverage or liquid in said receptacle, and a dispensing conduit leading from said receptacle and extending through said housing and terminating in a discharge faucet located outside of said housing, whereby the gaseous carbon dioxide in a highly dispersed state may be delivered into the beverage or liquid contained in the receptacle to carbonate and place it under a head pressure sufficient for dispensing through said dispensing conduit and heat absorbed by the sublimation of the solid carbon dioxide may be taken from the body of liquid in the receptacle thus effecting cooling thereof.

2. Apparatus for carbonating and dispensing beverages or liquids comprising an insulated housing, a closed container made of heat conducting material for the reception of solid carbon dioxide mounted in said housing, means carried by said container and arranged to open above a predetermined pressure and liberate gas from said container into said housing, a receptacle adapted to contain a body of beverage or liquid to be carbonated disposed in said housing, a tube having a perforated lower portion extending through and terminating at a point adjacent the bottom of said receptacle, a conduit leading from said container and connecting with the upper portion of said tube for conveying the gaseous carbon dioxide from said container into said receptacle beneath the surface of the body of beverage or liquid contained therein, a sleeve of porous material surrounding said perforated portion of said tube for disseminating the gaseous carbon dioxide into a highly dispersed state and introducing same into contact with the body of the beverage or liquid in said receptacle, and a dispensing conduit leading from said receptacle and extending through said housing and terminating in a discharge faucet located outside of said housing, whereby the gaseous carbon dioxide in a highly dispersed state may be delivered into the beverage or liquid contained in the receptacle to carbonate and place it under a head pressure sufficient for dispensing through said dispensing conduit and heat absorbed by the sublimation of the solid carbon dioxide may be taken from the body of liquid in the receptacle thus effecting cooling thereof.

ALBERT ROREN.